United States Patent
Chang et al.

(10) Patent No.: US 6,562,272 B1
(45) Date of Patent: May 13, 2003

(54) APPARATUS AND METHOD FOR DELAMINATION-RESISTANT, ARRAY TYPE MOLDING OF INCREASED MOLD CAP SIZE LAMINATE PACKAGES

(75) Inventors: Bo Chang, Cupertino, CA (US); Vani Verma, Sunnyvale, CA (US); Annie Tan, Singapore (SG)

(73) Assignee: Cypress Semiconductor Corporation, San Jose, CA (US)

( * ) Notice: Subject to any disclaimer, the term of this patent is extended or adjusted under 35 U.S.C. 154(b) by 175 days.

(21) Appl. No.: 09/730,910

(22) Filed: Dec. 5, 2000

(51) Int. Cl.[7] .................. B29C 45/40; B29C 45/14; B29C 70/72; H01C 21/56
(52) U.S. Cl. ............... 264/272.14; 264/272.17; 425/123; 425/444; 425/556
(58) Field of Search .................. 425/116, 123, 425/125, 544, 572, 588, 444, 556, 215; 264/272.14, 272.15, 272.17, 334; 438/112

(56) References Cited

U.S. PATENT DOCUMENTS 6,428,731 B1 * 8/2002 Bernardus Peters et al. ..... 264/272.14
6,465,277 B2 * 10/2002 Lee et al. .................. 438/112

FOREIGN PATENT DOCUMENTS

JP          06084985 A  *  3/1994  ........... H01L/21/56

\* cited by examiner

*Primary Examiner*—Robert Davis
(74) *Attorney, Agent, or Firm*—Wagner, Murabito & Hao LLP

(57) ABSTRACT

An apparatus and method for providing delamination-resistant, array type molding of chip laminate packages such that larger chip array block sizes may be employed. An advanced mold die provides multiple wells for the formation of ejector pin tabs to be formed integrally to the mold cap of a chip laminate package. The die further provides for an ejector pin hole to be located at each ejector pin tab such that the ejector pins, when pressed for release of the laminate package from the mold die, bear against the integrally formed pin tabs rather than against the substrate of the chip/substrate assembly. The placement of the ejector pins for bearing against the pin tabs precludes the loading of the interface within the laminate package between the mold cap and the chip/substrate assembly. Substantially reduced delamination of the chip laminate package is achieved allowing for the use of larger chip array block sizes and providing for a substantial reduction in chip laminate package moisture sensitivity.

20 Claims, 9 Drawing Sheets

500

```
┌─────────┐
│  START  │
└────┬────┘
     ▼
┌──────────────────────────────────────────────┐
│ CLAMP ADVANCED MOLD DIE TO CHIP/SUBSTRATE    │
│ ASSEMBLY                                     │
│ 510                                          │
└────┬─────────────────────────────────────────┘
     ▼
┌──────────────────────────────────────────────┐
│ PROVIDE AN EJECTOR PIN IN EACH EJECTOR PIN   │
│ HOLE AND CONSTRAIN EACH PIN FROM MOVEMENT    │
│ UNDER MOLD PRESSURE                          │
│ 520                                          │
└────┬─────────────────────────────────────────┘
     ▼
┌──────────────────────────────────────────────┐
│ INJECT MOLTEN MOLD MATERIAL INTO ADVANCED    │
│ MOLD DIE SUCH THAT CAVITY AND TAB WELLS ARE  │
│ FILLED SO THAT EJECTOR PIN TABS ARE FORMED   │
│ INTEGRALLY WITH THE MOLD CAP                 │
│ 530                                          │
└────┬─────────────────────────────────────────┘
     ▼
┌──────────────────────────────────────────────┐
│ ALLOW FOR MOLTEN MATERIAL TO COOL AND        │
│ SOLIDIFY                                     │
│ 540                                          │
└────┬─────────────────────────────────────────┘
     ▼
┌──────────────────────────────────────────────┐
│ UNCLAMP MOLD DIE FROM CHIP/SUBSTRATE         │
│ ASSEMBLY AND REMOVE EJECTOR PIN CONSTRAINTS  │
│ 550                                          │
└────┬─────────────────────────────────────────┘
     ▼
┌──────────────────────────────────────────────┐
│ PRESS EJECTOR PINS AGAINST THE EJECTOR PIN   │
│ TABS INTEGRALLY FORMED WITH THE MOLD CAPS    │
│ SO TO REMOVE THE LAMINATE PACKAGE FROM THE   │
│ MOLD DIE                                     │
│ 560                                          │
└────┬─────────────────────────────────────────┘
     ▼
┌─────────┐
│   END   │
└─────────┘
```

APPARATUS AND METHOD FOR DELAMINATION-RESISTANT, ARRAY TYPE MOLDING OF INCREASED MOLD CAP SIZE LAMINATE PACKAGES

FIELD OF THE INVENTION

The present invention relates to semiconductor chip manufacturing. More particularly, the embodiments of the present invention pertain to an apparatus and method for the delamination-resistant array type molding of increased mold cap size laminate packages.

BACKGROUND OF THE INVENTION

The manufacture of semiconductor chips is performed in multiple ways depending on the chip type. For instance, one mode of chip manufacture is an array type manufacture wherein multiple chips are simultaneously fabricated in arrays. Within this process a rectangular array of chips, such as a 5×5 array, is formed where the chips are formed or placed side by side in multiple rows. Each such rectangular array is commonly referred to as a block, and multiple blocks are formed and connected in a row to form a strip. The chips are soldered to a substrate sheet which is often a laminate of electrically conductive and non-conductive materials. The result may be referred to as a chip/substrate assembly.

On a single substrate sheet, multiple strips may be formed and connected to one another. The total number of chips manufactured on a substrate sheet in a single cycle of the manufacturing process is then equal to the number of chips in a block (25 for a 5×5 array) times the number of blocks per strip and times the number of strips per substrate sheet. Increasing the total chip count in a single cycle of manufacturing can therefore be gained by increasing the chip count per block, block count per strip, and/or strip count per sheet. The resulting increase in chip count per substrate sheet enhances the cost effectiveness of the manufacturing process.

One of the final steps in chip manufacture is packaging where the application of a protective coating over the chip/substrate assembly results in a chip laminate package. Following the build up of the chips themselves and the soldering of these chips to the substrate or laminate sheet, a ceramic or plastic layer is added over the chip/substrate assembly to prevent exposure of the chip circuitry to mechanical or chemical damage. The most typical chemical damage occurs from moisture entering the laminate package and corroding the circuitry.

The array type manufacture of multiple chips is used on BGA (Ball Grid Array) type chips. BGA chips have an array of solder balls placed on one side of the chip which provide for input/output to the chip assembly. The chips are placed onto the substrate such that the solder balls are in contact with appropriate contact points on the substrate and then the chips are soldered into place. Once soldered onto the substrate, the array of chips, grouped into blocks and with the blocks connected in strips, are then coated with a protective plastic covering. For BGA chip/substrate assemblies the molding process is a single sided molding process, that is the protective layer need only be molded on the side of the assembly to which the chips are soldered.

An approach known in the art for single sided molding onto a chip array is a molding process where the chip/substrate assembly is placed over a mold die where the mold die is contoured to create multiple cavities for forming a mold cap over each of the multiple blocks of chips soldered to the substrate. The mold die and chip/substrate assembly are held together while molten plastic is forced under pressure into the mold die cavities. Once the molten plastic has been allowed to cool, the mold die is removed from the surface of the resulting laminate package by pressing multiple pins against the substrate such that the chip/substrate assembly with newly molded protective layer is pushed from the mold die.

A key measure of chip manufacture and of plastic BGA package quality is the Moisture Sensitivity Level (MSL). The MSL scale ranges from 1 through 5, where a chip having an MSL rating of 1 is essentially insensitive to environmental moisture conditions while a chip having a MSL rating of 5 is very sensitive to environmental moisture and must be accordingly protected from exposure to moist environments. Chip packages commonly rate an MSL value of 3 and therefore have reduced life and reliability when exposed to moist environments.

Following the manufacturing process the chip laminate packages are commonly inspected for delamination of the molded protective layer from the chip substrate. The greater the delamination, the greater the likelihood for the ingress of moisture into the chip assembly, and resultingly, a more moisture sensitive laminate package results.

The conventional art in the packaging of array type chip laminate packages is described below in reference to FIGS. 1 and 2. A rectangular block of chips, commonly comprised in the industry of a n×m array, is arranged and soldered to a substrate sheet. Additionally, multiple blocks are arranged in a row on the substrate sheet to form a strip. The conventional art, shown in FIG. 1, is a cross section of the industry typical strip assembly combined with the mold die used for forming a mold cap over the chip/substrate assembly. Within the cross section, five chips 30 are shown arranged in a row across the width of the substrate sheet 10 and are soldered to the substrate sheet 10 prior to the molding process.

In the molding process common to industry, mold die 40 is clamped against substrate sheet 10 and molten plastic is forced into the mold die cavity to form mold cap 20. Following the cool down and solidification of the molten plastic, the mold die 40 is separated from the newly formed laminate package 5, shown in FIG. 2 and described below. The separation of the mold die 40 from the substrate sheet 10 of FIG. 1 is achieved by forcing ejector pins 50 against the substrate 10. The mold cap 20 is pulled from the mold die 40 by means of its adhesion to the substrate sheet 10 and chips 30.

FIG. 2 shows a cross section view of the chip laminate package 5 achieved commonly in industry and corresponding to the mold die 40 of FIG. 1. The industry typical chip laminate package 5, shown in cross section in FIG. 2, contains chips 30 in rows five abreast which are soldered to substrate sheet 10 and covered by mold cap 20.

Increased productivity in array type chip manufacture could be gained through increasing the number of chips manufactured in each array. One of the most efficient approaches would be to increase the chip count within each block. For example, increasing the chip array size within a block from 5×5 to 7×7 would result in a chip count increase of 96%.

However, attempts to gain manufacturing speed and efficiency by increasing the number of chips in each block beyond a 5×5 array have yielded unsatisfactory product. The result has been a greater percentage of poor quality chips in the array generally resulting from the chip array having a greater degree of delamination of the protective layer from the chip/substrate assembly and a concomitant increase in moisture sensitivity.

Additionally there is a desire to reduce the moisture sensitivity of chip laminate packages so that they may be stored and subsequently utilized without regard to environmental moisture levels. Chip laminate packages commonly achieve a MSL rating of 3. Achieving a MSL rating of 1 for laminate packages would practically eliminate the need to wrap laminate packages with a moisture-barrier. An MSL rating of 1 may also provide chips in laminate packages with longer shelf lives.

An apparatus and method is needed that reduces delamination in array type molding of laminate packages, enables larger chip array block sizes to be employed, and reduces in general the moisture sensitivity of chip laminate packages employing array type molding.

SUMMARY OF THE INVENTION

Accordingly, the present invention provides an apparatus and method for delamination-resistant, array type molding of chip laminate packages such that larger chip array block sizes may be employed. The invention further reduces in general the moisture sensitivity of chip laminate packages employing array type molding.

A necessary step in the array type manufacturing process of chip laminate packages is the removal of the laminate package from the mold die after the molding of the protective layer onto the chip/substrate assembly. In the removal of the laminate package from the mold die, the adhesion of the newly molded package protective layer to the mold die cavity surfaces causes package-to-die extraction forces to be generated. These extraction forces have been conventionally overcome by pressing ejector pins against the substrate sheet surface adjacent to the mold cap.

It has been determined that during the package removal process performed in the heretofore industry typical manner, delamination of the molded protective layer from the laminate substrate may often occur and cause a reduced quality laminate package. Embodiments of the invention provide for an apparatus and method of molding such that the delamination occurring during the removal of the laminate package from the die is significantly reduced or eliminated.

In an embodiment of the invention, an advanced mold die may provide multiple wells for the formation of ejector pin tabs integral to the mold caps of a chip laminate package. The die further provides for an ejector pin hole that may be located at each ejector pin tab such that the ejector pins, when pressed for release of the laminate package from the mold die, bear against the integrally formed pin tabs rather than against the substrate of the chip/substrate assembly. The mold cap-to-mold die adhesion forces are overcome by the force of the ejector pins being transferred into and through the ejector pin tabs and then directly into the mold cap at the tab interface locations along the edges of the mold cap.

The improvement offered by the invention substantially reduces delamination of the chip laminate package and additionally accommodates the use of larger chip array block sizes. An embodiment of the invention when implemented in prototype manufacturing has allowed an increase in block size such that a 7×7 chip array per block has been achieved from an industry typical size of a 5×5 chip array per block.

By reducing the delamination of the chip laminate package, the invention has provided for a substantial reduction in chip laminate package moisture sensitivity. An MSL rating of 1, that being associated with the least sensitivity to moisture, may be regularly achieved with implementation of the invention in the array type manufacture of ball grid array (BGA) laminate packages. The industry available molding practices typically provide for laminate packages achieving an MSL rating of only 3 and for arrays with a smaller (5×5) chip size.

BRIEF DESCRIPTION OF THE DRAWINGS

The operation of this invention can be best visualized by reference to the following drawings described below.

FIG. 9 is a flow diagram of a method for providing delamination-resistant, array type molding of chip laminate packages in accordance with an embodiment of the invention.

DETAILED DESCRIPTION

Described below is an apparatus and method for providing delamination-resistant, array type molding of chip laminate packages such that larger chip array block sizes may be employed. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
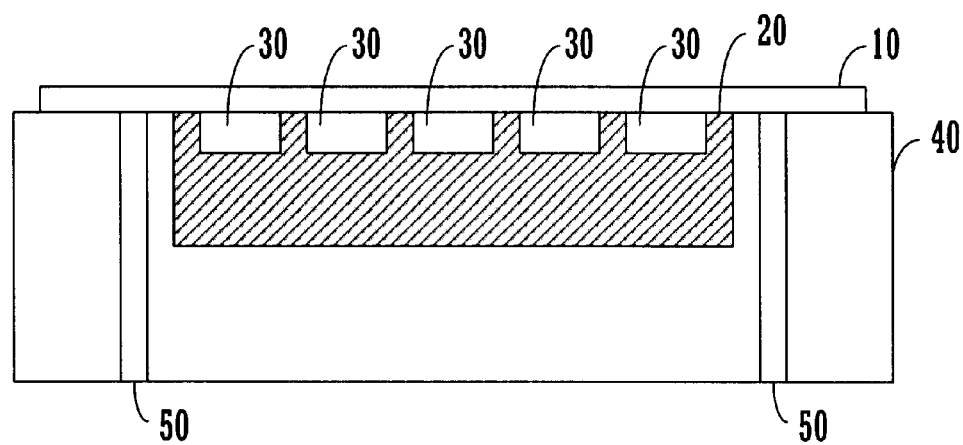
FIG. 1 is a cross section view of an industry conventional configuration mold die and chip/substrate assembly.
Figure 2:
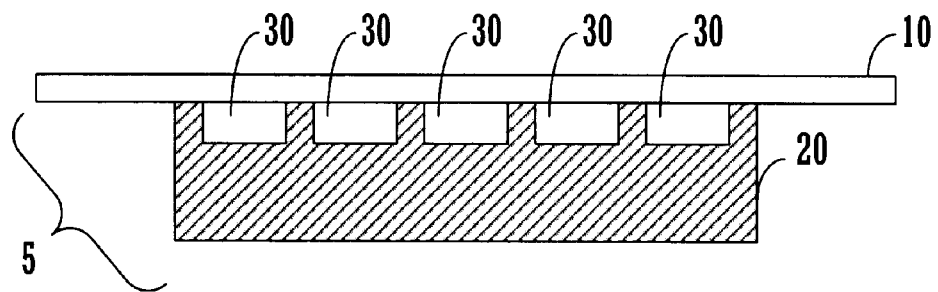
FIG. 2 is a cross section view of the industry conventional chip laminate package resulting from the industry conventional configuration shown in FIG. 1.

In the industry conventional approach, as shown by example in FIG. 1, the adhesion of mold cap 20 to substrate sheet 10 and chips 30 for removal of the mold cap 20 from the mold die 40 is not always effective, and sometimes results in the creation of delaminations between mold cap 20 and substrate sheet 10 and/or between mold cap 20 and chips 30. These delaminations cause the resulting laminate package 5 shown in FIG. 2 to have a significant sensitivity to moisture, commonly at a MSL rating of 3. These delaminations create voids between substrate 10 and mold cap 20 which allow for moisture ingress and subsequent corrosion.

Figure 3:
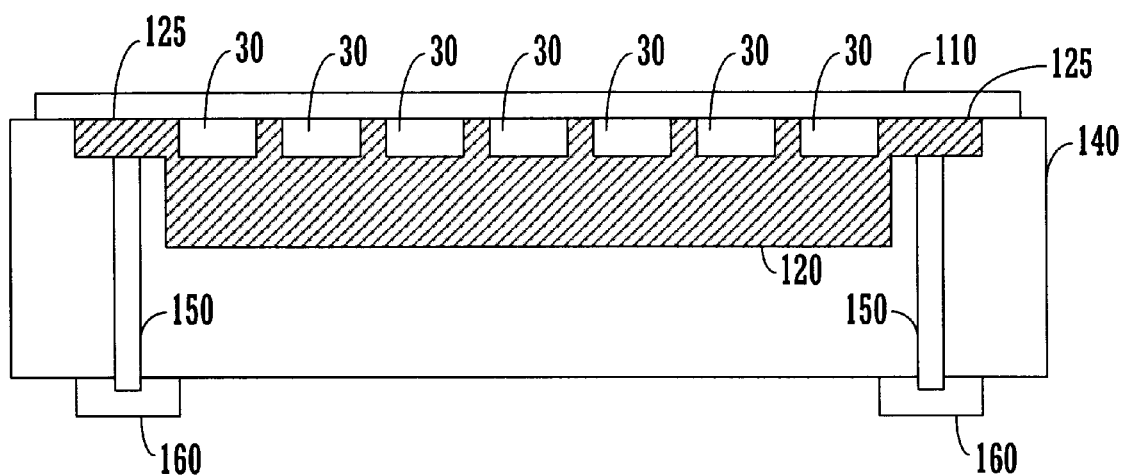
FIG. 3 is a cross section view of the advanced mold die and increased array size chip/substrate assembly in accordance with an embodiment of the invention.

The invention, however, does not rely exclusively on the adhesion of the mold cap to the chips and substrate for the removal of the mold cap from the mold die, and furthermore reduces the loading of this interface. FIG. 3 depicts a cross section view of the advanced mold die combined with an increased array block size in accordance with an embodiment of the invention. In FIG. 3, the advanced mold die 140 includes a cavity to allow the formation of mold cap 120 which includes the integral formation of ejector pin tabs 125. Further, the width of mold cap 120 provides for coverage of a row of seven chips 30 on substrate sheet 110. Ejector pins 150 are positioned such that they bear on pin tabs 125 when pressed for removal of the mold cap 120 from mold die 140, rather than bearing on the substrate sheet 110. Pin constraint pads 160 may be mechanically attached or constrained to mold die 140 and prevent movement of ejector pins 150 from mold pressure during the molding process. In lieu of the pads 160, the constraint of pins 150 could also be achieved by supporting the lower surface of the mold die 140 and the pins 150 together on a table or platen.

Following the solidification of mold cap 120, pads 160 may be removed for providing access to the ejector pins 150. The pins 150 are pressed against the tabs 125 thus allowing removal of the mold cap 120 from the mold die 140. The action of the pins 150 against the tabs 125 reduces and may preclude the loading of the newly adhered interface of the mold cap 120 to the substrate sheet 110 and chips 30.

Figure 4:
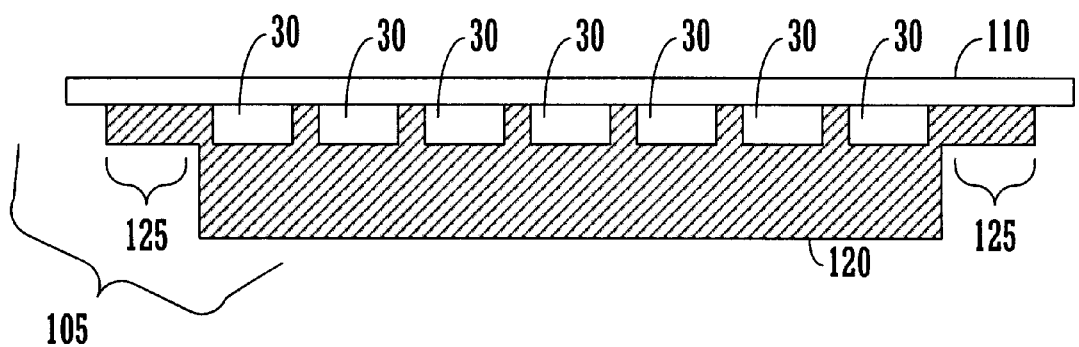
FIG. 4 is a cross section view of the chip laminate package resulting from the advanced mold die and increased array size chip/substrate assembly combination shown in FIG. 3, in accordance with an embodiment of the invention.

FIG. 4 is a cross section view of the chip laminate package 105 resulting from the advanced mold die 140 and increased array block size combination shown in FIG. 3, in accordance with an embodiment of the invention. Laminate package 105 contains, in example, chips 30 in rows seven abreast attached to substrate sheet 110 which are covered by mold cap 120 having integrally formed ejector pin tabs 125. The apparatus of the invention described in the embodiment of FIG. 3 provides for a delamination-resistant laminate package 105.

Figure 5:
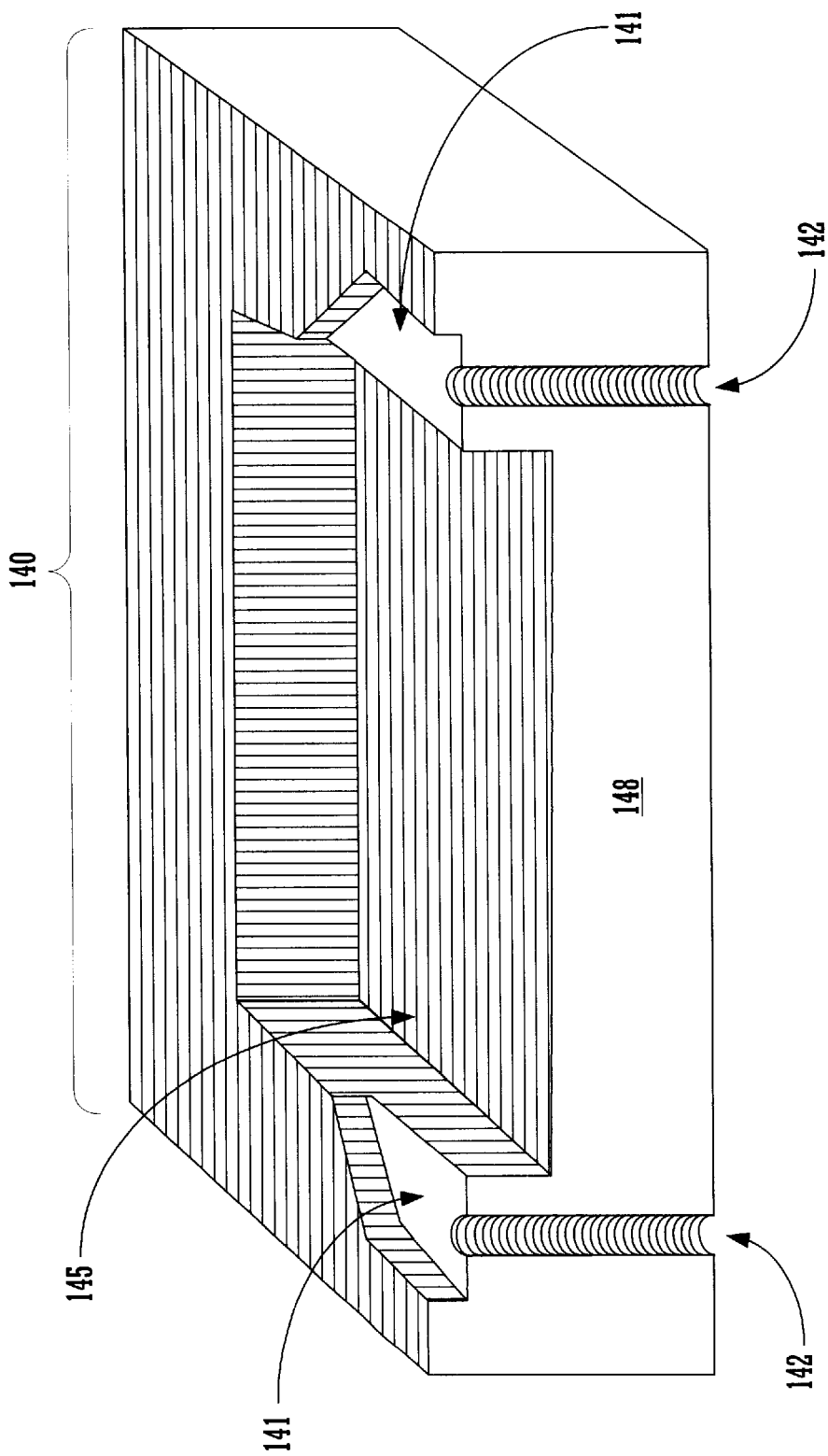
FIG. 5 is an isometric view of a section of the advanced mold die corresponding to the cross section view of FIG. 3, in accordance with an embodiment of the invention.

FIG. 5 shows an isometric representation of a portion of the advanced mold die 140 wherein the cross section depicted in FIG. 3 is extended backward to show a three dimensional view in accordance with an embodiment of the invention. Mold die 140 is comprised of a mold body 148 which provides one or more mold cavities 145 and appropriately positioned and formed multiple wells 141, shown in cross section, which provide for the integral formation of ejector pin tabs 125 to mold cap 120 as shown in FIG. 3. Additionally, ejector pin holes 142, shown in cross section in FIG. 5, are located at each well 141 for allowing the placement of ejector pins 150 as shown in FIG. 3.

In the embodiments of the invention, the ejector pin tabs 125 are formed such that they are of sufficient thickness to not tear away from the mold cap 120 when pressed upon for ejecting the mold cap 120 from the mold die 140 as shown in FIG. 3. Additionally the wells 141 are of sufficient depth that proper and sufficient flow of the molten mold material is maintained. Preferably, the mold material comprises a conventional mold material (which may further comprise a conventional filler such as silica or alumina) having a stiffness (or Young's modulus) sufficient to (a) reduce the loading forces between the mold cap and the chip/substrate assembly and/or (b) overcome the adhesion forces between the mold cap and the mold die. Such materials may comprise conventional thermoplastic or thermoset polymers, with thermoset polymers such as conventional epoxies being preferred.

In one example of the invention, the mold material may comprise silicon dioxide nodules interspersed in an epoxy matrix. The wells 141 are of sufficient depth that the silicon dioxide nodules are free to flow into the wells 141 and thus provide for a proper silicon dioxide/epoxy mixture to exist within the subsequently formed pin tabs 125.

Figure 6:
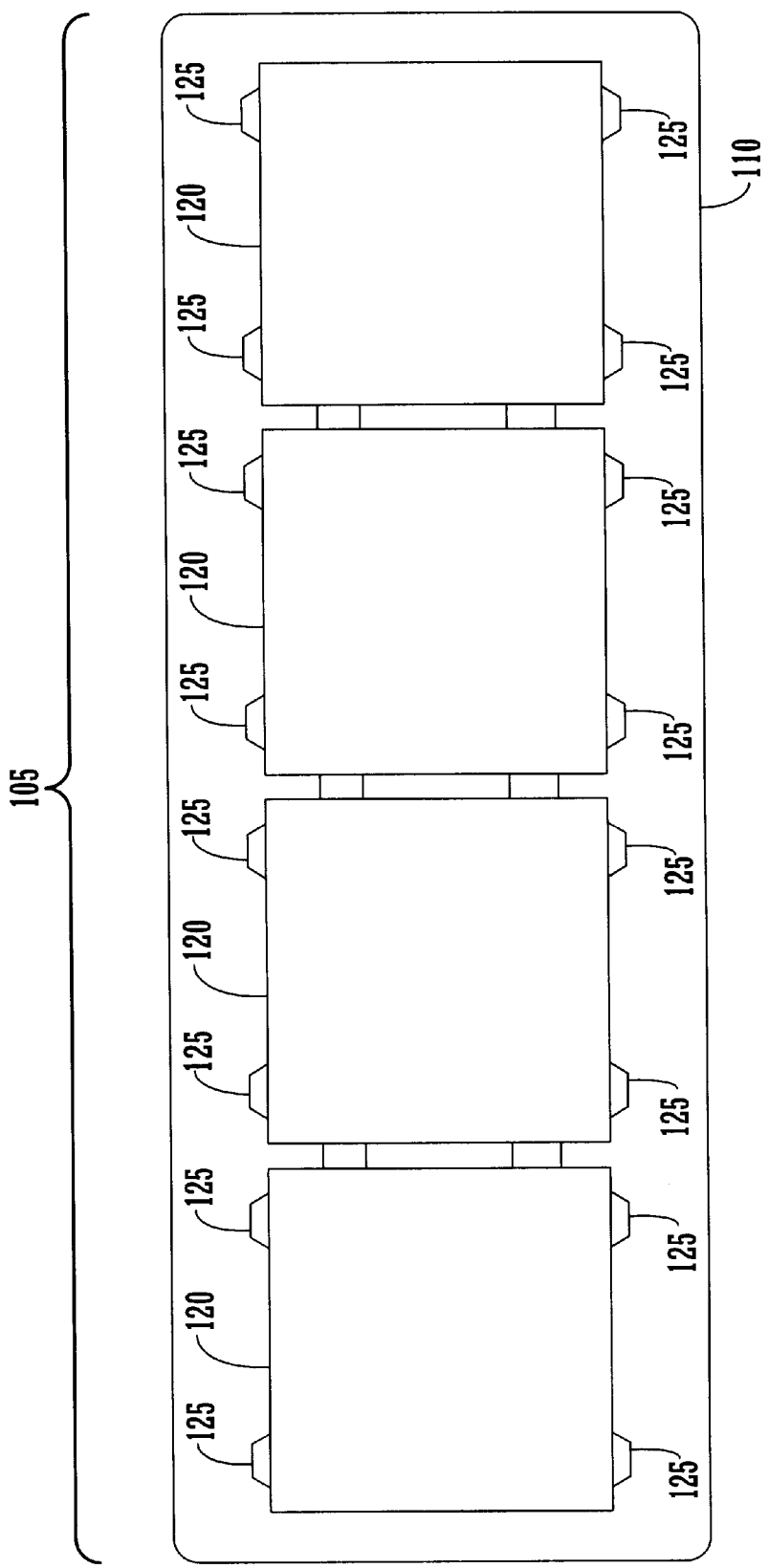
FIG. 6 is the top view of a single strip, chip laminate package in accordance with an embodiment of the invention.

The invention may be implemented in a variety of chip array configurations. FIG. 6 shows the top view of one exemplary configuration of the chip laminate package 105 in accordance with an embodiment of the invention. In referencing the top view of laminate package 105 shown in FIG. 6 to the cross section view shown in FIG. 4, it should be understood that in FIG. 4 the top surface is facing downward. In the embodiment shown, four mold caps 120 with underlying chip array blocks may be aligned in a row such that the laminate package 105 forms a strip. In this embodiment, two ejector pin tabs 125 are positioned on each of two opposing sides of each mold cap 120 such that a row of eight tabs 125 are positioned on each long side of the laminate package 105.

Figure 7:
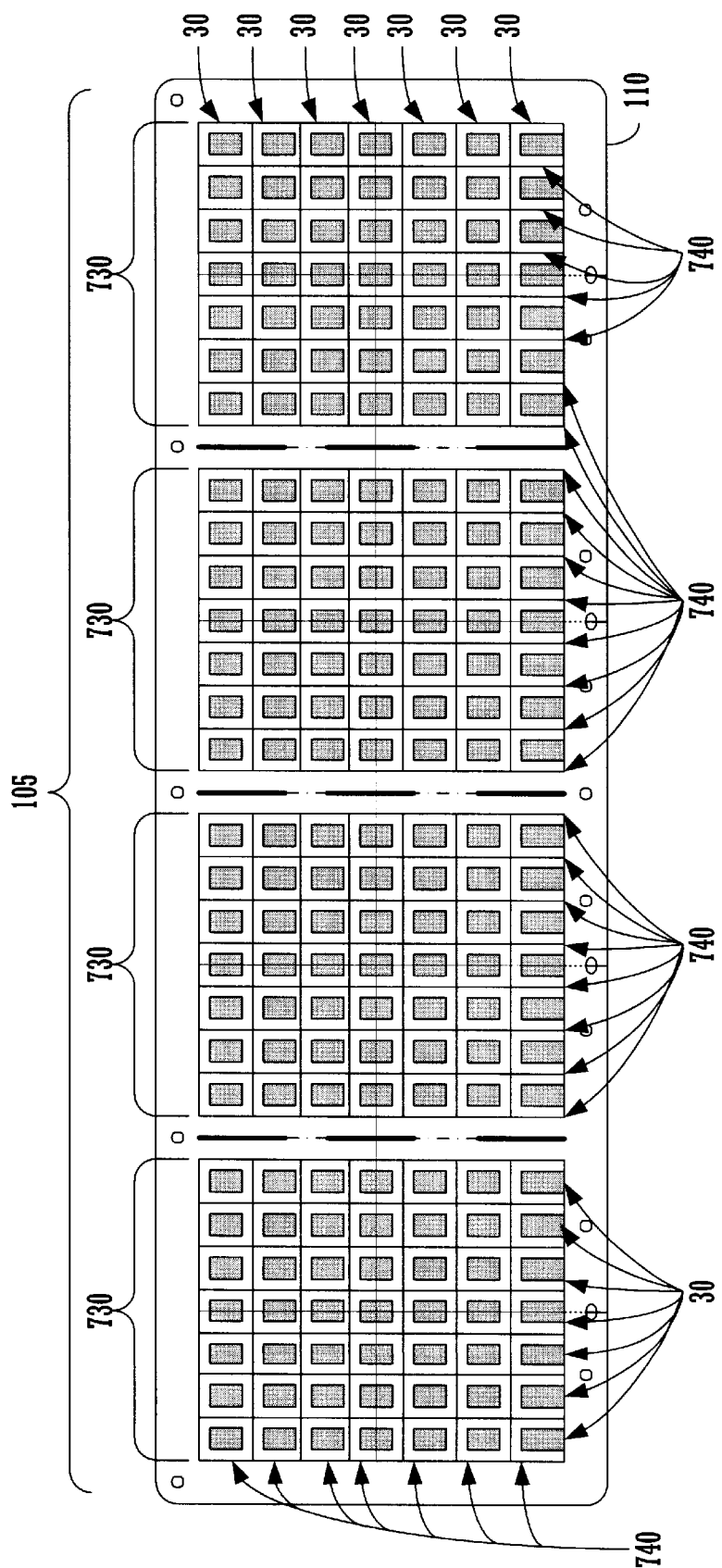
FIG. 7 is the bottom view of a single strip, chip laminate package in accordance with an embodiment of the invention.

FIG. 7 shows the bottom view of the chip laminate package 105 embodiment shown in FIG. 6. Four chip array blocks 730, each being a 7×7 array of chips 30, are shown positioned on the substrate sheet 110.

In the embodiment depicted in FIGS. 6 and 7, the laminate package 105 would be ejected from its mold die by pressing ejector pins against each of the pin tabs 125 shown in FIG. 6.

Figure 8:
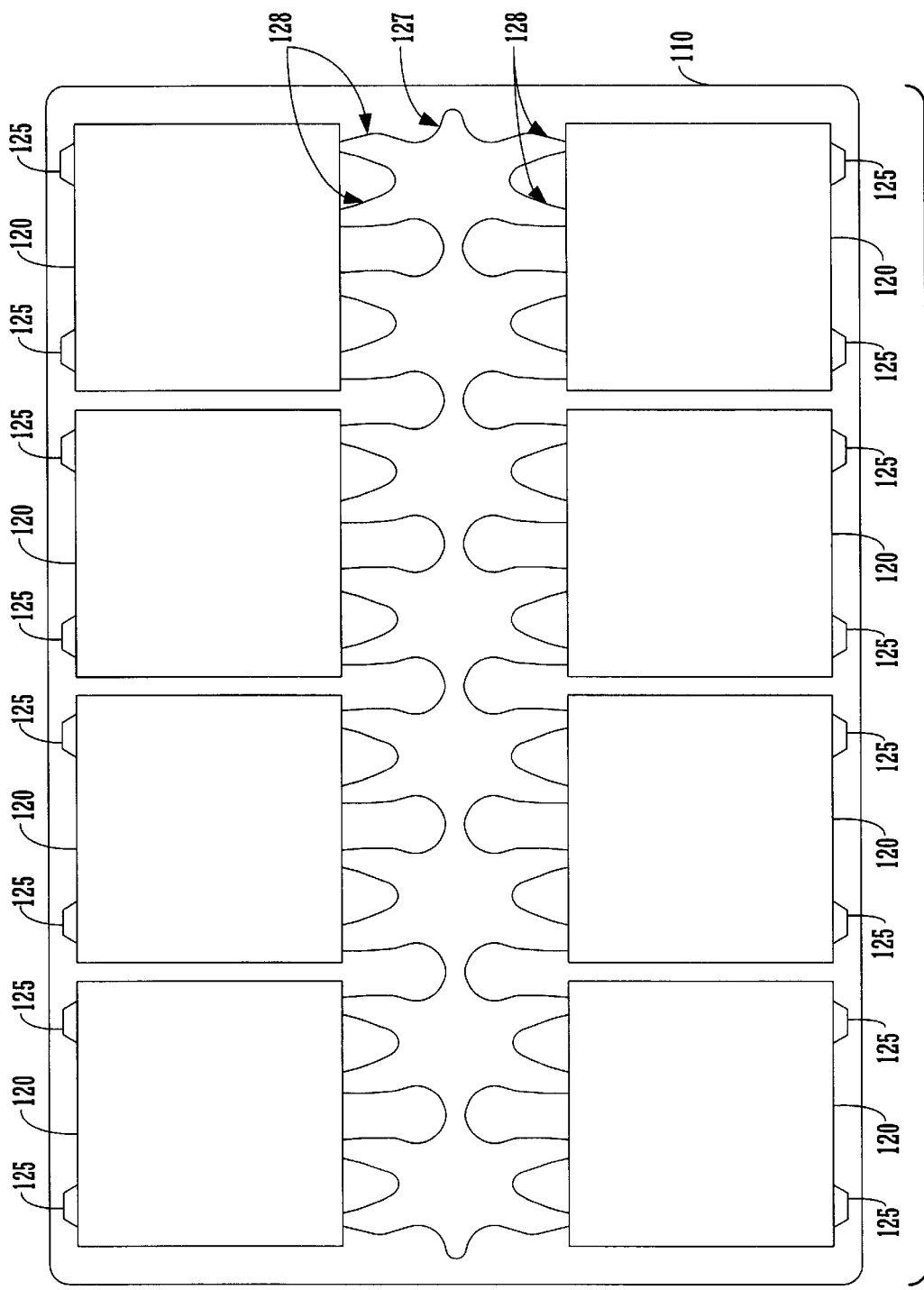
FIG. 8 is the top view of a dual-strip, chip laminate package in accordance with an embodiment of the invention.

Further, multiple strips may be connected to one another and formed on a single substrate sheet. In FIG. 8 a top view of an embodiment of an exemplary chip laminate package having two strips is shown. In the embodiment of a laminate package 205, two strips each containing four mold caps 120 may be arranged and connected to one another by mold bridgework 127. In this embodiment, two rows of eight ejector pin tabs 125 may be utilized in combination with bridgework legs 128 for providing ejector pin contact points for ejection of the laminate package 205 from its mold die. The utilization of the bridgework legs 128 in combination with the pin tabs 125 provides ejector pin contact to mold structure that is integral with the mold caps and thereby precludes the loading of the interface between the mold cap and the chip/substrate assembly in accordance with an embodiment of the invention. The mold bridgework 127 may be formed as part of the mold cull, that is the molded structure resulting in the multi-legged bridgework passageways of the mold die provided for feeding the molten mold material to the various cavities.

The total number of chips manufactured on a substrate sheet in a single cycle of the manufacturing process is equal to the number of chips in a block (25 for a 5×5 array) times the number of blocks per strip and times the number of strips per sheet. An increase in the number of chips arrayed in each block brings about a substantial increase in chip count for each manufacturing cycle and thus significantly increases the UPH (units per hour) of the chip assembly process. Based on the increased block size afforded by the invention, the increase in chip count in the embodiment shown in FIG. 3 relative to the industry conventional approach shown in FIG. 1 is, for instance, 96%.

In another embodiment ejector pin tabs are located between the blocks of each strip and on the ends of each strip such that tabs are integrally located on all four sides of each mold cap.

A method for providing delamination-resistant, array type molding of chip laminate packages is depicted by the flow diagram 500 in FIG. 9 in accordance with an embodiment of the invention. The method begins with step 510 wherein an advanced mold die, providing multiple wells for the formation of ejector pin tabs integral to the mold caps and providing a hole at each well for the location of the ejector pins, is clamped to the chip/substrate assembly. Next in step 520, ejector pins are provided in each ejector pin hole and are constrained such that they cannot move under molding pressure.

In step 530 of FIG. 9, molten molding material is injected into the advanced mold die such that the mold cap cavities and ejector pin tab wells are filled so that ejector pin tabs are formed integrally with the mold caps.

In step 540 the molten material is allowed to cool and solidify and then in step 550 the mold die is unclamped from the chip/substrate assembly and the ejector pin constraints are removed.

Finally in step 560 of FIG. 9, the laminate package is removed from the mold die by pressing the ejector pins such that they bear against the ejector pin tabs. The unavoidable and undesirable adhesion of the mold cap to the surfaces of the mold die cavity, common to all molding processes, is overcome in the invention by the force of the ejector pins being transferred into and through the ejector pin tabs and then directly into the mold cap at the tab interface locations along the edges of the mold cap.

By the combination of steps 510–560 in accordance with an embodiment of the invention, the direct loading of the interface between the newly formed mold cap and the chip/substrate assembly is precluded and delaminations are thereby reduced or avoided. The forces between the mold cap and the chip/substrate assembly induced in removing the mold cap from the mold die are generally reduced relative to the methods of the prior art.

Additionally, referring in example to FIG. 7, after removing the laminate package 105 from the mold die, individual mold cap/chip/substrate assemblies may be formed by dicing, sawing, or cutting the chip array blocks 730 along the lines 740. This provides individual packaged integrated circuits in a BGA (or fine-pitch BGA) package. The process and assembly of the present invention is particularly advantageous in an automated packaging process, where multiple packaging steps (such as die/substrate assembly, mold injection, and laminate package sawing or dicing) are performed in one or more apparatus (and where two or more apparatus, the apparatus work in conjunction with one another).

In another embodiment of the invention, the method described above is modified such that the ejector pins are emplaced prior to the clamping of the mold die to the chip/substrate assembly. The constraint of the ejector pins is then provided by the die-to-assembly clamping mechanism. Release of the ejector pins is thereby accomplished at the unclamping of the mold die from the chip/substrate assembly.

It would be appreciated by those with ordinary skill in the art that the present invention may be practiced in any number of different hardware configurations.

Hence, an apparatus and method for the delamination-resistant, array type molding of increased mold cap size laminate packages is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the Claims appended hereto and their equivalents.

What is claimed is:

1. A mold die for providing delamination-resistant, array type molding of chip laminate packages comprising:
   a mold body;
   a cavity for allowing molten material to flow and encompass a pre-determined surface area of a chip/substrate assembly to form a mold cap over said chip/substrate assembly;
   multiple wells for the formation of ejector pin tabs integral to said mold cap; and
   an ejector pin hole located at each said well for aligning an ejector pin at each said pin tab for the ejection of said mold cap.

2. The die of claim 1 further comprising additional multiple cavities for the formation of multiple mold caps over a chip/substrate assembly composed of multiple chip array blocks arranged in a strip such that a mold cap is formed over each said block of said strip and wherein each said cavity incorporates multiple said wells for the formation of multiple ejector pin tabs on said mold caps.

3. The die of claim 2 wherein said wells are arranged on opposing sides of said blocks such that said wells comprise a row of said ejector pin tabs on each long side of said strip.

4. The die of claim 2 further comprising additional multiple cavities to accommodate at least one additional strip and a bridgework passageway with multiple legs for feeding said molten material to said multiple cavities of said strips.

5. The die of claim 4 wherein said legs of said bridgework passageway are arranged such that molded legs resulting from said passageway may be utilized in combination with said pin tabs for application of ejector pin forces in removal of said laminate package from said mold die.

6. The die of claim 3 wherein said cavities form mold caps of a size sufficient to cover chip array blocks comprising 7×7 arrays of chips, said strip comprises four said blocks, and two said wells are incorporated on two opposing sides of each said cavity such to form a row of at least eight pin tabs on each long side of said strip.

7. The die of claim 5 wherein said cavities form at least two said strips arranged parallel to one another and said bridgework passageway is positioned to form said legs between said strips, and said wells are arranged to form a row of said pin tabs on each long side of each said strip not connected to said legs.

8. An apparatus for providing chip laminate packages comprising:
   a mold die comprising a mold body, a cavity for allowing molten material to flow and encompass a pre-determined surface area of a chip/substrate assembly during a molding process to form a mold cap over said chip/substrate assembly, multiple wells for the formation of ejector pin tabs integral to said mold cap, and an ejector pin hole located at each said well for aligning an ejector pin at each said pin tab for the ejection of said mold cap; and
   multiple mold ejector pins wherein one said pin is positioned in each said pin hole and aligned to bear against said pin tabs when pressed for ejection of said mold cap from said mold die.

9. The apparatus of claim 8 further comprising:
   a constraint for each said ejector pin that constrains each ejector pin from movement under mold pressure loads occurring during said molding process; and
   a clamp for maintaining contact and relative position of said mold die to said chip/substrate assembly during the molding process.

10. The apparatus of claim 8 wherein said mold die further comprises:
   multiple cavities for the formation of multiple mold caps over a chip/substrate assembly composed of multiple chip array blocks arranged in a strip such that a mold cap is formed over each said block of said strip; and
   multiple wells at each said cavity for the formation of multiple ejector pin tabs on said mold caps.

11. The apparatus of claim 10 wherein said wells are arranged on opposing sides of said blocks such that said wells are for forming a row of said ejector pin tabs on each long side of said strip.

12. The apparatus of claim 10 wherein said mold die further comprises multiple cavities to accommodate at least one additional strip, and a bridgework passageway with multiple legs for feeding said molten material to said multiple cavities.

13. The apparatus of claim 10 wherein said legs of said bridgework passageway are arranged such that molded legs resulting from said passageway may be utilized in combination with said pin tabs for application of ejector pin forces in removal of said laminate package from said mold die.

14. A method for providing chip laminate packages comprising the steps of:
   a) clamping a mold die to a chip/substrate assembly wherein said mold die comprises a cavity for forming a mold cap over said chip/substrate assembly, multiple wells for forming ejector pin tabs integral with said mold cap, and an ejector pin hole containing an ejector pin therein at each well such that molten mold material is prevented from flowing through said ejector pin hole;
   b) injecting said mold material into said cavity to form said mold cap; and
   c) pressing each said ejector pin through said ejector pin hole to eject said chip laminate package from said cavity.

15. The method of claim 14 further comprising the step of:
   a1) providing an ejector pin constraint at each said ejector pin such that said ejector pin is constrained from movement under mold pressure.

16. The method of claim 15 further comprising the step of:
   b1) unclamping said mold die from said chip/substrate assembly and unconstraining each said ejector pin.

17. The method of claim 14 wherein said step of pressing reduces loading of said chip/substrate assembly relative to an otherwise identical mold die without said wells.

18. The method of claim 14 wherein said mold die further comprises multiple cavities arranged to form mold caps over multiple strips of chip array blocks.

19. The method of claim 18 wherein said step of pressing further comprises pressing bridgework ejector pins against legs formed by a bridgework passageway placed between said multiple strips.

20. The method of claim 19 wherein said step of pressing reduces loading of said chip/substrate assembly relative to an otherwise identical mold die without said legs formed by said bridgework passageway.

* * * * *